United States Patent [19]
Vivian et al.

[11] Patent Number: 6,090,197
[45] Date of Patent: Jul. 18, 2000

[54] METHOD FOR RECYCLING PARTICULATE WASTE MATERIAL AND PRODUCT OBTAINED THEREBY

[75] Inventors: Thomas A. Vivian, Flint; Colleen O'Connor, Upton, both of Mich.

[73] Assignee: Gage Products, Inc., Ferndale, Mich.

[21] Appl. No.: 09/075,292

[22] Filed: May 8, 1998

Related U.S. Application Data

[60] Provisional application No. 60/046,350, May 13, 1997, and provisional application No. 60/059,756, Sep. 23, 1997.

[51] Int. Cl.[7] .............................. C04B 14/28; C04B 18/24
[52] U.S. Cl. ......................... 106/739; 106/745; 106/792; 106/817; 428/903.3
[58] Field of Search ......................... 428/903.3; 106/745, 106/739, 817, 792

[56] References Cited

U.S. PATENT DOCUMENTS

| | | | |
|---|---|---|---|
| 3,734,773 | 5/1973 | Haley | 127/48 |
| 4,799,965 | 1/1989 | Bakker et al. | 127/46.2 |
| 5,480,490 | 1/1996 | Toth et al. | 127/42 |

*Primary Examiner*—Paul Marcantoni
*Attorney, Agent, or Firm*—Gifford, Krass, Groh, Sprinkle, Anderson & Citkowski, P.C.

[57] ABSTRACT

Calcium carbonate sludge from sugar beet refining is recycled for use as a blast cleaning medium; and contaminate blast cleaning media is employed in the manufacture of cement. Also disclosed herein is the use of pumice as an additive to enhance the efficiency of blast cleaning media.

16 Claims, 2 Drawing Sheets

METHOD FOR RECYCLING PARTICULATE WASTE MATERIAL AND PRODUCT OBTAINED THEREBY

RELATED APPLICATIONS

This patent application claims priority of provisional patent applications Ser. No. 60/046,350 filed May 13, 1997 and Ser. No. 60/059,756 filed Sep. 23, 1997.

FIELD OF THE INVENTION

This invention relates generally to methods for recycling and reusing calcium carbonate waste sludge, which is a byproduct of sugar refining. More specifically, the invention relates to a method for using components of the waste sludge in a blast cleaning process. The invention also includes a method for recycling spent blast media, particularly media contaminated with metals such as chromium and lead, into a cement product. In another aspect, the invention includes a novel material which may be used as a blast medium; or as a component of a blast medium, which enhances the effectiveness of the medium, and/or improves its flow characteristics.

BACKGROUND OF THE INVENTION

In the production of sugar from sugar beets, calcium oxide (lime), which is obtained by the thermal decomposition of calcium carbonate, is added to process liquors. In various stages of the refining procedure, carbon dioxide gas is introduced into the limed process liquors. This results in the production of a calcium carbonate precipitate, referred to as calcium carbonate sludge. This sludge is a byproduct of sugar production, and presents a waste disposal problem. The calcium carbonate sludge is generally of a very fine particle size, and cannot be readily recycled into calcium oxide in a conventional lime kiln. In some instances, special kilns may be employed to reconvert the calcium carbonate back to calcium oxide, which can subsequently be employed in the sugar refining process. U.S. Pat. Nos. 5,480,490 and 3,734,773 show such reclamation processes. However, the amount and extent to which such reuse and recycling may take place is limited, since the calcium carbonate sludge includes byproducts of the sugar refining process, and repeated reuse of the material results in a concentration of such contaminants in the process. As a consequence, sugar beet refiners find themselves faced with relatively large volumes of calcium carbonate sludge. Disposal of this material in landfills is both wasteful and expensive. Consequently, there is a need for a system or method which would allow for the economic reuse of this product.

Blasting processes are widely used for cleaning paint, corrosion and other contaminants from a variety of surfaces such as buildings, bridges, industrial equipment and the like. Blasting processes are also used to clean circuit boards and other electrical components. In a typical blast cleaning process particles of a blasting medium are entrained in a stream of high velocity gas, usually air, and directed against an object. Impingement of the medium removes surface contamination and coatings from the object. Typical blasting media comprise sand, glass, metal particles and plastic particles. A typical blasting process will generate a fairly large volume of used blasting medium, and the spent medium presents a significant disposal problem, particularly when it is contaminated with lead, chromium, cadmium paint residues and other industrial coatings which are generally classified as hazardous waste. As a consequence, spent blasting media must often be disposed of as hazardous waste, at high expense. In response to this problem, processes have been developed for decontaminating and/or recycling spent blast media, and one such process is shown in U.S. Pat. Nos. 5,372,650; 4,943,368 and 4,771,579. While such processes can be effective they are time consuming and expensive.

As will be explained in greater detail hereinbelow, the present invention provides a method whereby calcium carbonate sludge from a sugar beet refining process may be recycled so as to produce a high quality blasting medium. Furthermore, the present invention provides for the recycling of contaminated blast media from various sources into a cement product. Thus, the present invention provides the unexpected result of solving two significant waste disposal problems while simultaneously extracting dual value from a heretofore problematic waste material.

BRIEF DESCRIPTION OF THE INVENTION

There is disclosed herein a method for reclaiming and recycling a calcium carbonate waste product derived from a sugar beet refining process. In a first step of the method, the calcium carbonate waste produced in a sugar beet refining process is dried. The waste is then sized so as to separate a particulate fraction therefrom having a size range of 10×0 mesh. This particulate fraction is then employed as a medium in a blast cleaning process, which results in the generation of a volume of contaminated blast medium. In the final step of the process, the contaminated blast medium is heated in a cement kiln along with at least one other component of a cement composition so as to produce a cement clinker which includes therein calcium derived from the feed stock.

In specific instances, the blast medium comprises calcium carbonate having a size in the range of 16–150 mesh, while in other instances, the blast medium comprises calcium carbonate having a size range of 32–115 mesh, and in yet other instances, the carbonate has a size range of 12–70 mesh.

In further embodiments of the present invention, pumice is added to the carbonate blast medium, in an amount of 1 to 50% by weight of the medium. In specific embodiments, the pumice is present in an amount of approximately 10% by weight.

The present invention is also directed to a blast cleaning medium comprising calcium carbonate having a particulate size in the range of 115×0 mesh characterized in that the calcium carbonate is a precipitate resultant from the treatment of sugar beet process liquor containing calcium oxide, with carbon dioxide.

DETAILED DESCRIPTION OF THE INVENTION

Figure 1:
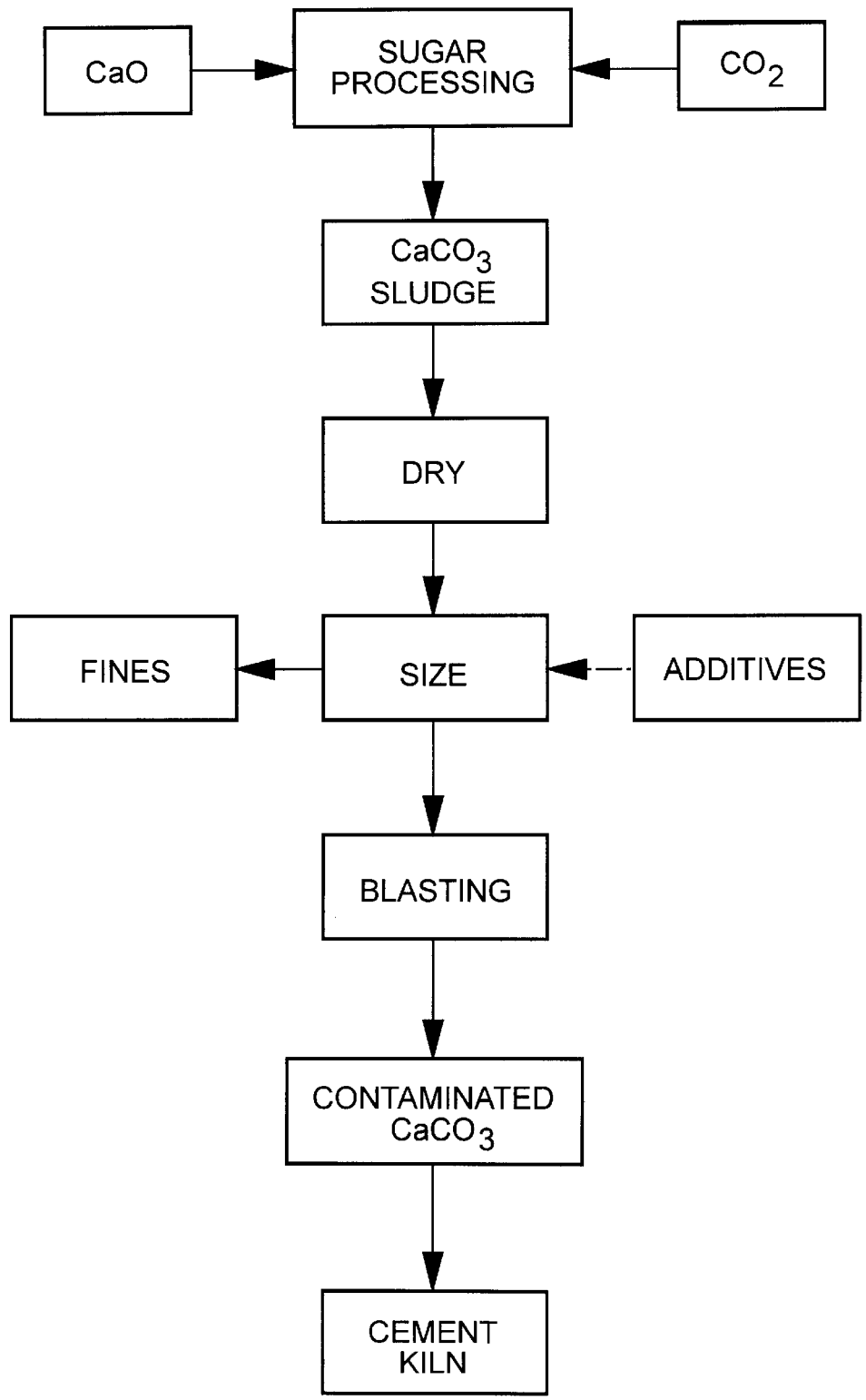
FIG. 1 is a flow chart illustrating various steps in the process of the present invention.

The present invention is directed to a method wherein calcium carbonate waste from a sugar refining process is recycled for use as a blast cleaning medium, and wherein contaminated blasting media is reused in a process for the manufacture of cement.

The process of the present invention begins with a feed stock which is comprised of a calcium carbonate sludge derived from a sugar beet refining process. This sludge is basically calcium carbonate particulates which are contaminated with various sugar beet wastes, primarily saccharide and polysaccharide derived materials. In a first step of the process, the feed stock material is dried. Drying may be carried out under ambient conditions, or at elevated temperatures. If high temperature drying is employed, the temperature should not be sufficiently high so as to decompose calcium carbonate back into calcium oxide. Usually, drying is accomplished at an elevated temperature in the range of 50–150° C.

The dried feed stock is then sized so as to separate therefrom a particulate fraction having a size in the range of 10×0 mesh. It has been found that particles in this size range are preferred as blasting media. Most preferably, the blasting medium will include a narrower size range of particles; since, it has been found that in many instances particles comprising the broadest size range may cause clogging in some blasting equipment.

It has been found that particles in the size ranges of 32×48 mesh, 48×115 mesh, and 115×0 mesh, all produced good results. In contrast, some clogging was noted when 32×0 mesh particles were used. Particles which are generally too fine for use in a blasting process are removed when the medium is sized, and such removed particles may be advantageously employed as a filler material for paper manufacturing, plastics manufacturing and other such applications well known in the art. The particular size of blast medium which will be employed will depend upon particulars of a blasting process, such as equipment characteristics, substrate being cleaned, and the like. Most typically, it has been found that calcium carbonate particle sizes smaller than 10 mesh are generally preferred, with particles in the size range of 12 to 70 mesh being optimum for most blasting applications, although other sizes of particles may be used for particular applications. Also, as will be detailed hereinbelow, additives such as pumice particles may be added to the carbonate medium, and these particles may be of the same size as the carbonate particles, or they may be of a different size.

Sizing is most advantageously carried out after the sludge has been dried; but, in some instances, it is contemplated that sizing could be carried out on a slurry or suspension. Sizing may be carried out by a sieving process utilizing screens of different mesh. Alternatively, cyclonic separators, fluid bed separators and the like may be employed. It is further anticipated that drying and sizing may, in some instances, be carried out simultaneously through the use of a stream of heated air. Sizing may be carried out a number of separate times so as to segregate particles having particular, relatively narrow size ranges, as adapted for certain applications.

In some embodiments, additives are incorporated into the carbonate medium, and pumice is one material which has been found to be useful in the present invention as an agent which enhances the activity of the carbonate medium. In such embodiments, approximately 1% to 50% of pumice is added, by weight, to the particulate fraction to enhance its effectiveness. In alternative embodiments, more than 50% or less than 1% of pumice may be added. Preferably, between 5% and 15% of pumice is added to the particulate fraction. Optimally, 10% of pumice, by weight, is added to the particulate fraction.

It has been found that the pumice enhances the activity of the blast medium and also improves its flow characteristics in the blasting system by minimizing clumping. These effects are noted even when relatively small percentages of pumice are included.

Figure 2:
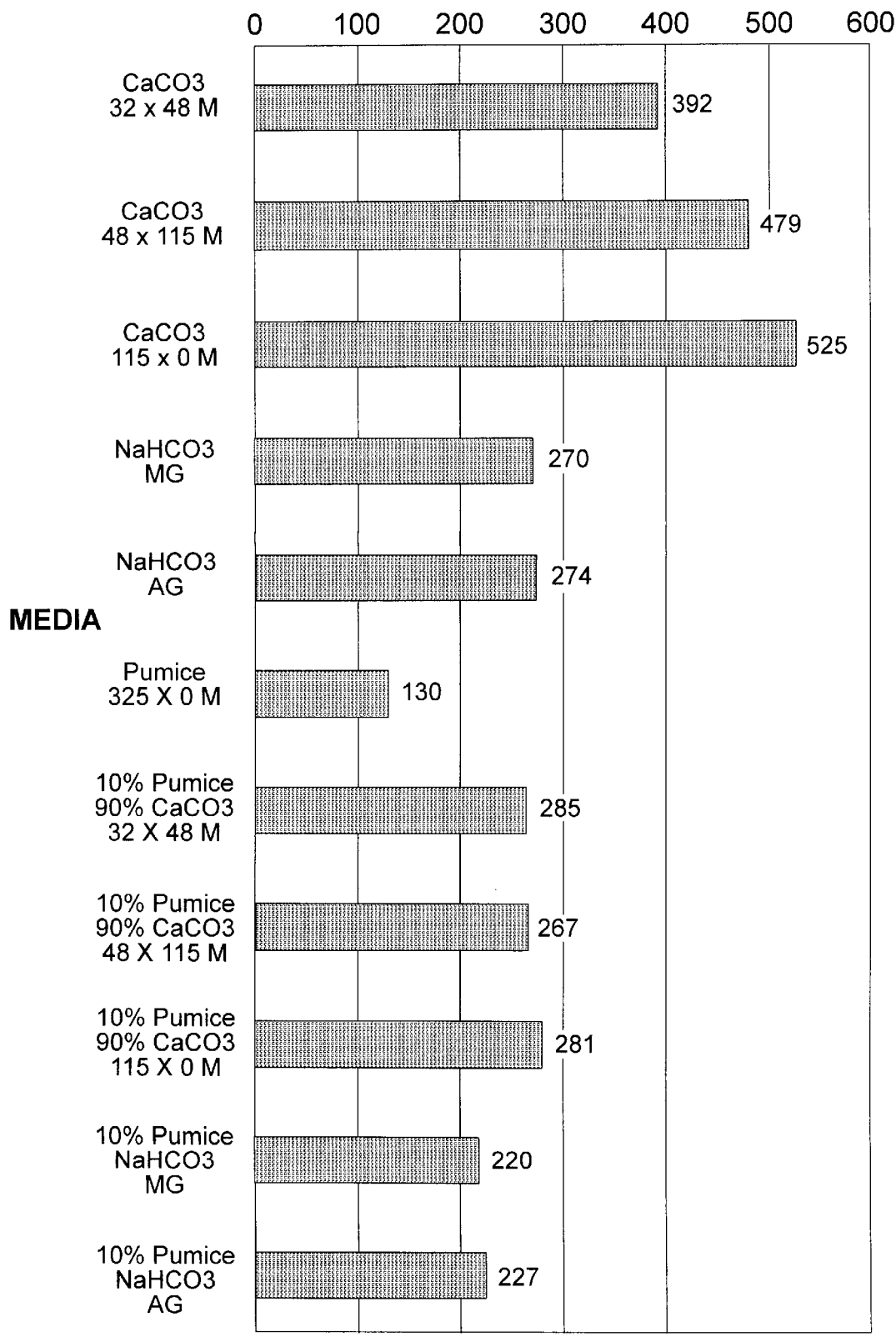
FIG. 2 is a graphic representation of results achieved utilizing various compositions of the present invention.

FIG. 2 compares the stripping effectiveness of the variety of blast media including calcium carbonate of various sizes, sodium bicarbonate and pumice, as well as blends of pumice with calcium carbonate and sodium bicarbonate. The vertical axis of the chart contained in FIG. 3 discloses the amount required of a particular blast medium to strip a standard sample comprising 1 square inch of aircraft alloy painted with a conventional aircraft paint.

As shown in FIG. 2, calcium carbonate having a mesh of 32×48 requires 392 grams of calcium carbonate to strip the sample. Upon addition of 10% by weight of pumice to calcium carbonate of the same mesh size, the effectiveness of the medium is enhanced, requiring only 265 grams of material. Likewise, calcium carbonate having a mesh size of 48×115 requires 479 grams to strip the sample. The addition of 10% by weight of pumice to this particular medium enhances its efficiency so that only 267 grams are required. The addition of 10% by weight of pumice to a maintenance grade sodium bicarbonate blasting medium increases the stripping effectiveness of such medium to 220 grams from 270 grams. Similarly, adding 10%, by weight, of pumice to an aircraft grade medium of sodium bicarbonate increases the stripping effectiveness of such medium from 274 grams to 227 grams.

In another experimental evaluation, varying amounts of pumice having a particle size and range of 80×325 mesh were added to calcium carbonate having a particle size of 115×0 mesh. Again, the various compositions were tested against a 1 square inch standard of aluminum aircraft alloy paint with standard aircraft paint. The control sample included no pumice, and required 520 grams to strip the sample, a result similar to that shown in FIG. 2. The same calcium carbonate medium including 5% pumice required 310 grams to strip the same sample; a sample with 10% pumice required 280 grams; one with 20% required 220 grams and one with 30% required 180 grams. These results show that a very significant improvement in stripping ability is achieved when as little as 5% of the pumice material is added. The activity of the pumice at such a low level is indicative of the fact that a beneficial interaction takes place between the pumice and calcium carbonate which provides for a synergistic enhancement. As such, the pumice acts as an accelerator for the blasting medium.

A similar series of evaluations were carried out utilizing alumina and glass beads as additives to a calcium carbonate blast medium. This found that neither of these conventional blasting materials produced any enhancement in the activity of the carbonate medium.

Accordingly, it will be appreciated that pumice is of significant benefit as an accelerator in combination with various blasting media. In addition, pumice may be utilized by itself as a blasting medium. The particle size of pumice employed will depend upon the particular application; however, it has been found that pumice having a particle size of 40 mesh and finer are most preferably employed as an additive for a blast medium. Most preferably, the pumice will have a particle size of less than 325 mesh. One particularly preferred size range is 325×80 mesh. It has also been found that 325×0 mesh particles have found significant utility in the invention and is second best to the 325×80 mesh particles. Particles in the size range of 100×40 mesh may also be employed, although they are not as good as 325×0 mesh particles.

While pumice is one additive which may be employed in the present invention, other materials such as anti-caking agents or flow agents, such as silicates or silicones, may be incorporated into the medium. Such agents are typically present in relatively small amounts; and like the pumice, they will not interfere with subsequent recycling of the spent blast medium.

In a second stage of the process of the present invention, the thus prepared blast medium is employed in a blasting process. The calcium carbonate media of the present invention (both with and without pumice) have been found to have particular advantage for cleaning paint from aircraft surfaces, since the hardness of the calcium carbonate is sufficient to efficiently remove high-hardness epoxy and urethane based aircraft paints, but is still low enough to prevent erosion of aircraft alloys. The presence of the pumice in the medium does not adversely affect the aircraft alloys.

In many instances, sodium bicarbonate is employed as a blasting medium for aircraft and other critical equipment; however, it readily absorbs water which causes it to cake and clump. This plugs blasting equipment. Consequently, bicarbonate blasting media often include water-repellent coatings on their particles. The material of the present invention is moisture stable, and even after storage at 35° C. and 100% relative humidity, no clumping occurred. Thus, the material of the present invention provides an attractive alternative to sodium bicarbonate media. The material of the present invention also has very good utility for general industrial usages such as stripping rust, paint and tars from buildings, bridges and equipment, and for cleaning printed circuit boards.

As noted above, the blasting process produces a spent blasting medium which is often contaminated with heavy metals, organic materials and other such components of paints and the like. These materials preclude disposal of the spent medium in ordinary landfills. It has been found, in accord with another aspect of the present invention, that the contaminated calcium carbonate media of the present invention may be advantageously employed in a process for the manufacture of the cement.

Cement is made by burning a mixture of calcium, aluminum and silicon containing oxide materials, which are typically derived from limestone, clay, marl, bauxite and the like, to the point of imminent fusion so as to produce a material referred to as clinker. This clinker is then cooled and ground to produce cement. The calcium carbonate based blast medium of the present invention can be readily substituted for a portion of the limestone used in making cement. A typical cement kiln operates at very high temperatures, and such temperatures are sufficient to degrade organic contaminants in the spent blasting medium. Furthermore, the calcium carbonate medium itself will function as a component of the cement; and as such, it replaces some of the limestone which would otherwise be a purchased component of the cement mixture. Metal oxides and similar inorganic contaminants in the spent medium become incorporated into the cement, in a nonleachable form, and hence the resultant clinker is no longer considered to be a hazardous material. Additionally, it is known in the art that the addition of pumice to cement mixtures results in a desirable set of characteristics for the cement, including high strength and high hardness. Thus, if pumice is incorporated in the blast medium, it becomes a beneficial additive to the cement product.

It will thus be appreciated that the present invention provides a unique solution to a number of problems. First of all, the present invention takes sugar beet refining sludge, which was heretofore a significant waste disposal problem, and converts it into a saleable product, namely a blast cleaning medium. The invention then takes another problematic material, namely contaminated blasting medium, and advantageously recycles it into cement thereby avoiding the cost of hazardous waste disposal and recovering further value as a substitute for purchased limestone. Integration of these three disparate businesses into a unified process is unanticipated in the art, and provides a number of points for the extraction of value. These two aspects of the invention may be used singly or in combination. That is to say, calcium carbonate sludge may be recycled into a blast medium which may or may not be subject to further recycling; also, spent calcium carbonate blast medium, whether derived from a sugar process or not, may be reused in a cement kiln.

In accord with the present invention, yet other modifications thereof may be implemented. For example, the contaminated blast medium may be recycled as a limestone substitute in other high temperature processes such as the production of iron and steel. Likewise, calcium carbonate containing sludges resultant from other industrial processes may be also advantageously recycled into blasting media. Other such modifications and variations will be apparent to one of skill in the art. It is the following claims, including all equivalents, which define the scope of the invention.

What is claimed is:

1. A method for reclaiming and recycling a calcium carbonate waste product from a sugar beet refining process, said method comprising the steps of:

providing a feed stock which comprises particulate calcium carbonate waste produced in a sugar beet refining process;

drying said feed stock;

sizing said feed stock so as to separate a particulate fraction therefrom, said particulate fraction having a size range of 10×0 mesh;

employing said particulate fraction as a medium in a blast cleaning process, whereby said blast cleaning process produces a volume of contaminated blast medium; and heating said contaminated blast medium in a cement kiln along with at least one other component of a cement composition, said component being selected from the group consisting of: clay, marl, bauxite, slag, limestone, and combinations thereof, at a temperature sufficient to produce a cement clinker including therein calcium which was derived from said feed stock.

2. A method as in claim 1, wherein the step of sizing of said feed stock comprises separating therefrom a particulate fraction having a size in the range of 16–150 mesh.

3. A method as in claim 1, wherein said step of sizing said feed stock comprises separating therefrom a particulate fraction having a size in the range of 32–115 mesh.

4. A method as in claim 1, wherein the step of sizing said feed stock comprises separating therefrom a particulate fraction having a size in the range of 32–48 mesh.

5. A method as in claim 1, wherein the step of drying said feed stock comprises drying said feed stock at an elevated temperature in the range of 50–150° C.

6. A method as in claim 1, wherein the step of drying said feed stock comprises drying said feed stock at a temperature below the decomposition temperature of calcium carbonate.

7. A method as in claim 1, wherein the step of heating said contaminated medium in a cement kiln comprises heating said contaminated medium with at least one material selected from the group consisting of: clay, marl, bauxite, slag, limestone, and combinations thereof.

8. A method as in claim 1, wherein the step of employing said separate particulate fraction as a medium in a blast cleaning process comprises employing said fraction as a medium for removing paint from a substrate; whereby, said medium becomes contaminated with paint residue.

9. A method as in claim 1, further including the step of adding pumice to said particulate fraction.

10. A method as in claim 9, wherein the step of adding pumice comprises the step of adding, by weight, 1% to 50% pumice.

11. A method as in claim 10, wherein the step of adding pumice comprises the step of adding, by weight, 5% to 15% pumice.

12. A method as in claim 11, wherein the step of adding pumice comprises the step of adding, by weight, 10% pumice.

13. A method as in claim 9, wherein said pumice has a size in the range of 40×0 mesh.

14. A method for reclaiming a calcium carbonate blast cleaning medium, said method comprising the steps of:

providing a feed stock which comprises particulate calcium carbonate;

employing said calcium carbonate as a medium in a blast cleaning process, whereby said blast cleaning process produces a volume of contaminated blast medium; and heating said contaminated blast medium in a cement kiln along with at least one other component of a cement composition, said component being selected from the group consisting of: clay, marl, bauxite, slag, limestone, and combinations thereof, at a temperature sufficient to produce a cement clinker including therein calcium which was derived from said feed stock.

15. A method as in claim 14, wherein the step of employing said calcium carbonate as a medium in a blast cleaning process further includes the step of adding pumice to the calcium carbonate.

16. A method for recycling a contaminated blast cleaning medium comprised of calcium carbonate particles, said method comprising:

heating said contaminated blast medium in a cement kiln along with at least one other component of a cement composition, said component being selected from the group consisting of: clay, marl, bauxite, slag, limestone, and combinations thereof, so as to produce a cement clinker including therein calcium which was derived from said blast medium.

* * * * *